United States Patent
White

(10) Patent No.: US 6,168,516 B1
(45) Date of Patent: Jan. 2, 2001

(54) DEVICE AND METHOD FOR AN AUTOMOBILE AIR VENT INTAKE SYSTEM

(76) Inventor: Thomas H. White, P.O. Box 221, Issaquah, WA (US) 98027

(*) Notice: Under 35 U.S.C. 154(b), the term of this patent shall be extended for 247 days.

(21) Appl. No.: 08/655,649

(22) Filed: May 30, 1996

(51) Int. Cl.[7] .................................................... B60H 1/28
(52) U.S. Cl. .......................................... 454/146; 454/149
(58) Field of Search .................................... 454/146, 148, 454/149; 296/192

(56) References Cited

U.S. PATENT DOCUMENTS

| | | | |
|---|---|---|---|
| 1,681,942 | * 8/1928 | Ledwinka | 454/149 |
| 2,279,369 | * 4/1942 | Findley | 454/148 |
| 3,845,983 | * 11/1974 | Heintz | 454/149 X |
| 5,479,984 | * 1/1996 | Easterbrook et al. | 454/284 X |

* cited by examiner

Primary Examiner—Harold Joyce
(74) Attorney, Agent, or Firm—Robert B. Hughes; Hughes & Schacht, P.S.

(57) ABSTRACT

A method of preventing clogging and leaking in an automobile air vent system where there is an upwardly facing air vent grill which is made of a magnetically permeable material and is positioned at an upper portion of the body surface of the automobile forwardly of the windshield. This air vent is covered by a generally planar intake cover having a perimeter configuration substantially the same as the vent intake opening. This cover is made of a magnetic material which when placed over the vent cover remains securely in place and prevents the clogging (and thus leaking) of the air vent system.

11 Claims, 2 Drawing Sheets

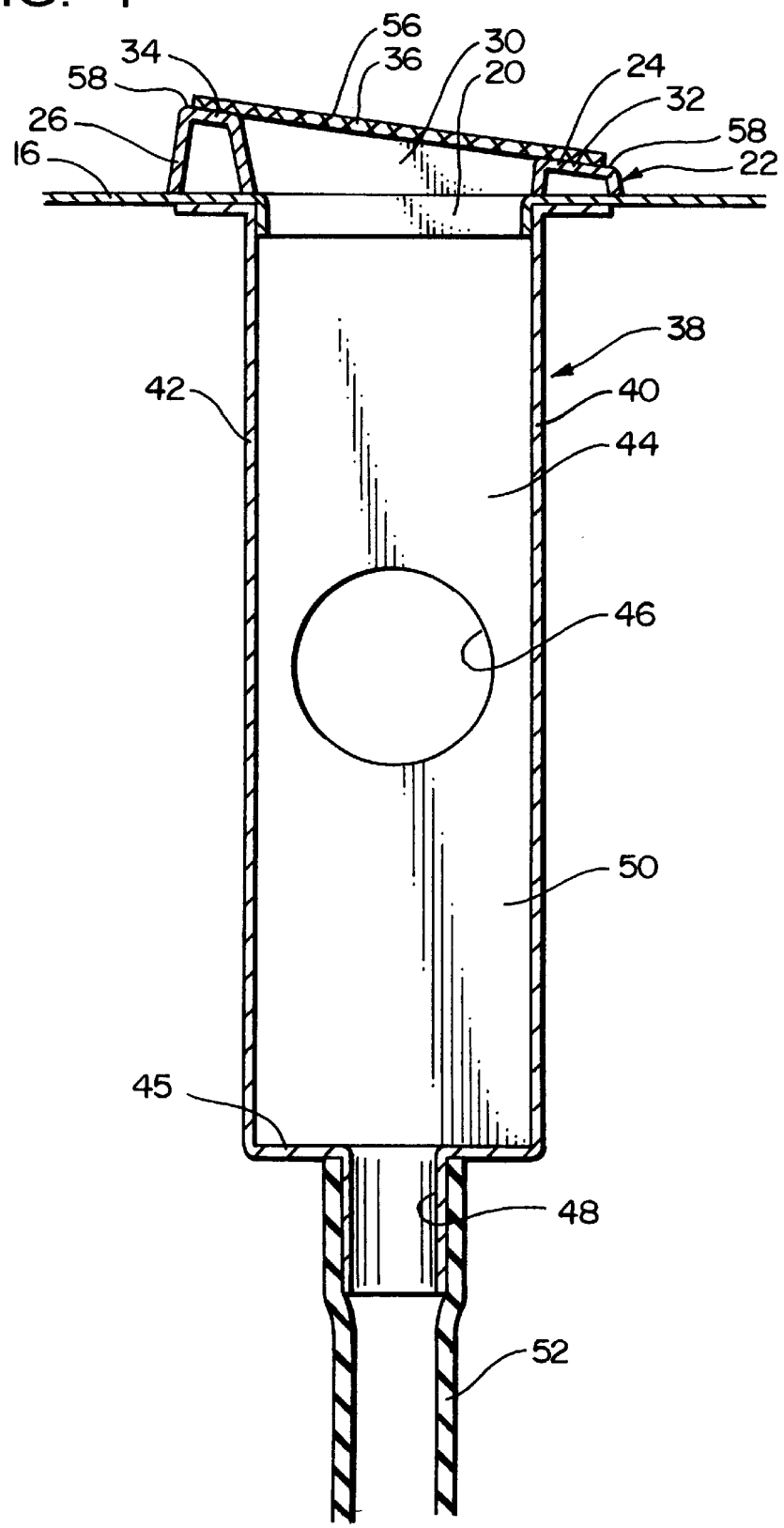

DEVICE AND METHOD FOR AN AUTOMOBILE AIR VENT INTAKE SYSTEM

The present invention relates in general to air circulating systems for automobiles, and more particularly to a device and method for facilitating the proper function of, and avoiding improper functioning of, certain air vent intake systems of automobiles.

For many years, automobiles have had air circulating systems for the automobile, where ambient air is taken in through vents and then selectively directed into the interior of the automobile either for heating, air conditioning, defogging windows, etc. In some instances, the air vents can have rain or snow be ingested into the air vent, and also various unwanted materials such as leaves, twigs, or other debris. This sometimes can cause clogging of the drain and/or distribution system, or possibly leaking into the interior of the automobile.

A typical example of this is found in certain MG automobiles, and possibly others, where there is an air vent positioned on the upper quarter panel, a short distance forwardly of the windshield. This vent faces upwardly, and it is susceptible to having rain or other foreign material be drawn into the vent or simply fall into the intake vent, this causing water to leak into the automobile interior. Also sometimes the vent does not close properly, this causing a draft of cold air. These problems have been recognized, and different solutions have been proposed. For example, it has been attempted to make mechanical changes to the intake system to avoid such problems, or possibly add other elements or make operating changes to the system to solve the problems.

To the best knowledge of the applicant herein, such solutions have either not proven to be successful in resolving the problems, or they at least have not been implemented to any large degree possibly for other reasons, such as cost or inconvenience of installing the apparatus or components. In any event, this still remains a problem.

Accordingly, it is obvious that the present invention should provide a simple, convenient, and reliable solution to the problem noted above, of the air vent ingesting water, debris or other matter which either forms an obstruction in the system, which leads to leaking of water into the interior of the automobile, and also improper closing of the vent in cold weather.

SUMMARY OF THE INVENTION

This invention is to prevent clogging and leaking in an automobile air vent system where there is an upwardly facing air vent intake grill means which is made of a magnetically permeable material. The grill means is positioned on an upper portion of a body surface of the automobile forwardly of the forward windshield of the automobile, and has an intake opening with an intake open perimeter portion.

The method of the present invention comprises first providing a generally planar intake cover having a perimeter configuration substantially the same as the intake opening. The cover comprises a magnetic material extending over at least a substantial portion of the cover.

The cover is placed over the vent intake grill means where the perimeter of the cover is over the intake opening perimeter portions so as to enclose the intake opening, with the cover magnetically adhering to the grill means.

When the automobile is operated by driving it over the road surface, the cover remains positioned over the vent intake grill means to close the vent intake grill means from water and/or debris passing therethrough.

Also, the present invention comprises the combination of the automobile air vent system and the intake cover, as described above, positioned over the air vent intake grill means.

Other features will become apparent from the following detailed description.

BRIEF DESCRIPTION OF THE DRAWINGS

FIG. 4 is a sectional view taken transversely to the air vent and through the cover which is placed thereon, showing a portion of the air intake apparatus of the automobile for which the present invention is used.

With reference to FIG. 1, there is shown an automobile 10 comprising a front windshield 12 and a forward body portion 14, which in turn comprises an upper quarter body panel 16 positioned immediately forward of the lower edge of the window 12, and a hood 18. Centrally located, just forwardly of the front window 12, there is a vent opening 20 located in the middle part of the quarter body panel 16. There is also a grill 22 positioned in the vent opening 20.

Figure 1:
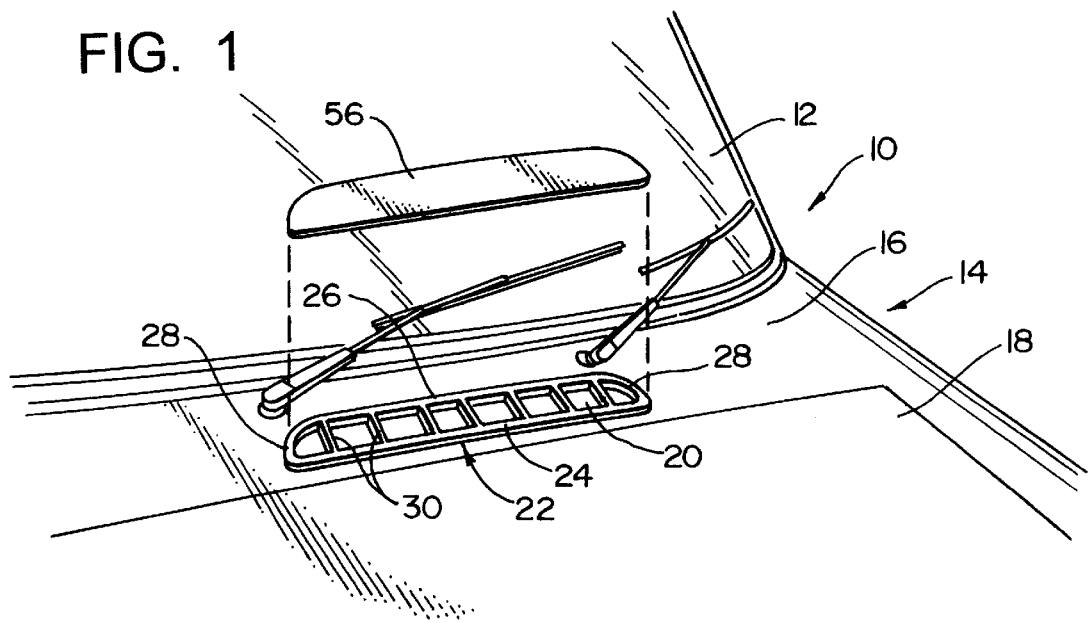
FIG. 1 is an isometric view looking downwardly and rearwardly toward the hood and windshield portion of an MG automobile having an air vent for which the present invention is intended to be used, and also showing above the air vent the cover member used in the present invention positioned above the vent.

This grill 22 comprises a forward straight bar 24, a rear straight bar 26, and two generally semi-circular end perimeter sections 28 which begin from the end edges of the bar 24 and curve in substantially a 90° curve to join to the rear bar 26. Also, there is a plurality of cross bars 30 extending in a forward to rear direction between the front and rear bars 26. The bars 24 through 30 can be made as a single integral metal piece. This grill 22 is, as is common with automobiles, made of a magnetically permeable material.

Reference is now made to FIG. 4, which shows the vent opening 20 and grill 22 in cross section. It can be seen that the front bar 24 and rear bar 26 are each configured in cross section as an inverted "U" extending moderately away from each other in a downward direction. The upper central section of the forward bar 22 is in the form of a planar elongate plate portion 32 that has a moderate downward and forward slant. In like manner, the rear bar 26 has an upper planar plate portion 34 that also has a moderately forward and downward slant, and the plane occupied by the plate member 32 and the plane occupied by the plate 34 lie in the same plane, which also would have the same forward and moderately downward slant. The upper surface of each of the cross bar members 30 lie in substantially the same plane as the upper surface of the plate portions 32 and 34.

A portion of the vent system is shown at 38 in FIG. 4. Immediately below the intake vent opening 20, there is positioned a box-like structure having forward and rear containing walls 40 and 42, two end walls 44 (only one of which is shown in FIG. 4), and a bottom wall 45. In each wall 44, there is a circular opening 46 through which air from the vent passes, to be discharged into other parts of the system, and into the interior of the automobile.

At the bottom of the box-like containing structure 38, there is a cylindrical outlet stub 48 leading from the interior 50 of box-like structure 38. This stub 48 connects to a hose 52 or other member, and this is intended to be an outlet hose for water or possibly other fluids or material which might collect in the chamber 50.

Figure 2:
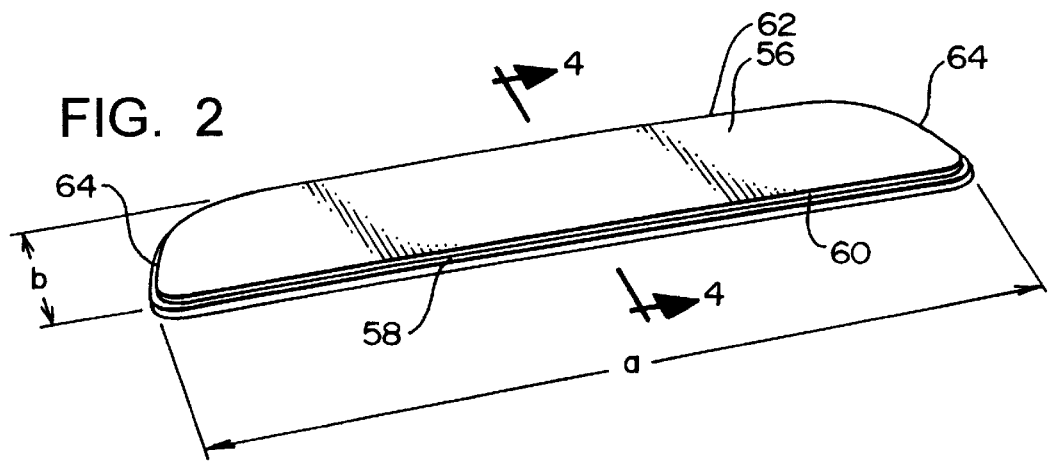
FIG. 2 is an isometric view taken approximately at the same position as that taken of FIG. 1, but showing only the perimeter of the air vent with the cover of the present invention placed thereon.

It has been found that in one or more models incorporating this design, that the vent system which is described above has had certain problems with regard to keeping it clean, with regard to leakage, and also not closing properly. The present invention solves these problems in a rather simple, yet unique and effective manner. As shown in FIGS. 1 and 2, the present invention provides a cover member 56 which is made of a moderately flexible magnetic strip of sheeting material. The material itself is already commercially available, and one brand of this is produced by the 3M Company and is identified as MGO-1016. This strip comprises barium ferrite crystals in a polymer binder. This magnet material is permanently magnetized with multiple north and south poles providing a minimum holding force of 16 ounces per square inch.

The particular strip material used in the present invention has a thickness of approximately one sixteenth of an inch. It is moderately flexible and a fifteen inch long strip of this can be folded over on itself in a full 360° curve.

A portion of this magnetic strip or sheet material is cut or otherwise formed so that its perimeter has substantially the same overall configuration as the outer perimeter of the grill 22, except that the cover member 56 has length and width dimensions slightly smaller than those of the grill 22. In the particular car model shown in the present invention, the lengthwise dimension of the grill 22 (designated "a" in FIG. 2) is about fourteen and fifteen sixteenth of an inch. Its width dimension (shown at "b" in FIG. 2) is about two and one half inches. The corresponding length and width dimensions of the cover 56 are as follows. The length dimension is about fourteen and three quarters inches, and the width dimension is about two and five sixteenths of an inch. Thus, with the cover 56 placed on top of the grill 22 and centered thereon so that the perimeter edge portion 58 of the grill 22 that still shows is uniform, the width of this perimeter portion 58 is approximately three thirty seconds of an inch.

With the cover member 56 having an overall configuration very similar to the perimeter of the grill 22, this cover member 56 comprises a front straight edge, a rear straight edge 62, and two side 90° curved edges 64. The method of the present invention comprises providing the cover member 56 as described above, and placing this with its magnetically attractive surface downwardly onto the top surface of the grill 22, and then centering the cover 56 on the grill 22.

It has been found that this cover member 56 reliably closes the grill 22 so that water and debris do not pass through the grill 22. Further, it has been found that this cover member 56 remains reliably secured to the grill 22, and it is not blown off, even when the automobile is traveling at relatively high speeds.

While there are probably various physical phenomenon involved to account for the reliability of the cover 56 in being able to remain in its closed position on the grill 22 so as to provide a reliable closure, it is believed that the following may contribute to this.

Figure 3:
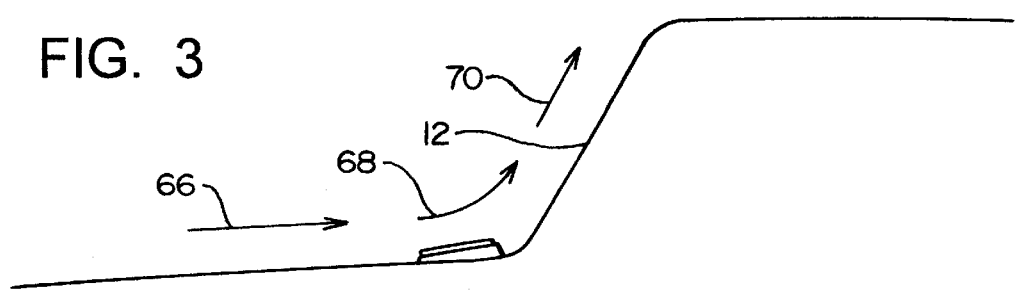
FIG. 3 is a side elevational view showing simply in outline the hood, quarter panel, windshield and upper body portion of the car, and also showing the intake air vent with the cover of the present invention thereon.

With reference to FIG. 3, it can be seen that when the car is traveling in a forward direction, there is an airflow (indicated by the arrow 66) over the hood, and this airflow is deflected upwardly (as indicated by the arrow 68) as it approaches the front windshield 12, and then continues in an upward path of travel (indicated by the arrow 70). It is surmised that this movement of the air over the hood and upwardly over the windshield results in a localized increase in the static pressure of the air forward of the windshield and immediately over the cover member 56. This would be accounted for a reduction of velocity as the airflow begins its curved upward path, as indicated by the arrow 68, and possibly due to a certain amount of stagnation of the airflow at the juncture of the windshield 12 and the upper quarter panel 16. Thus, it can be reasonably surmised that the air pressure immediately over the cover 56 is somewhat greater than local atmospheric pressure that would exist below the cover 56. Thus, there is likely a pressure differential from above the cover 56 to below the cover, which tends to draw the cover 56 downwardly onto the grill 22. Further, the cover 56 is moderately flexible, and this characteristic, coupled with the pressure differential, keeps the edge portions of the cover pressing with reasonable firmness against the upper surface portions of the grill. Further, with the cover member 56 being sufficiently thick and having only moderate flexibility, there would be little tendency for the cover member 56 to flutter, so as to cause aerodynamic forces to tend to lift the cover 56 off the grill 22. Another factor is that when the cover 56 Is placed on the grill 22, it has a downward and forward slant, so that the airflow over the cover 56 would be at a moderate upward slant.

In any event, regardless of whether or not the above analysis (or partial analysis) of the operation of the present invention is correct, it has been found in actual practice that the cover 56 does reliably cover the grill 22 and reliably seals grill 22 off from water and/or debris. Further, this cover 56 is very reliable in remaining securely placed on the grill 22.

When it is desired to have airflow through the vent 22, then it is a simple matter for the automobile driver simply to lift the cover member 56 off of the grill 22 and store it within the automobile.

It is recognized that various modifications could be made to the present invention without departing from the basic teachings thereof.

What is claimed:

1. A method of preventing clogging and leaking in an automobile air vent system of an automobile, where there is an upwardly facing air vent intake grill means which comprises a perimeter grill portion and a plurality of laterally spaced bars extending in a direction of travel of the automobile and is made of a magnetically permeable material, with the grill being positioned on an upper portion of a body surface of the automobile forwardly of the forward windshield of the automobile, said method comprising:

a. providing a generally planar intake cover having a perimeter configuration substantially the same as the intake opening, said cover comprising a piece of moderately flexible magnetic sheeting material which comprises magnetic particles in a polymer binder, with substantially the entire area of the cover having the magnetic particles therein;

b. placing the cover over the vent intake grill means where the perimeter of the cover is over the intake opening perimeter portions so as to close the intake opening, with the cover magnetically adhering to both the perimeter grill portion and the laterally spaced bars of the grill means;

c. operating the automobile by driving it over a road surface, with the cover remaining positioned over the vent intake grill means to close the vent intake grill means from water and/or debris passing therethrough;

d. said air vent intake grill means having a forward and moderately downward slant, so that airflow over the hood of the car and over the cover placed on the air vent intake grill means flows at a moderately upward slant in a rearward direction, and over the windshield to create an increase in pressure over said cover, thus enhancing the cover's ability to remain positioned over the air vent grill means, said cover having a depth dimension and weight sufficiently great to resist aerodynamic flutter when it is positioned over the vent intake grill means, so as to remain substantially stationary in its position over said air vent intake grill means.

2. The method as recited in claim 1, wherein the air vent system of the automobile comprises a containing structure positioned below the grill means, said containing structure having a lower drain opening means susceptible to clogging, whereby said cover prevents debris from entering the vent intake grill means and clogging the drain opening.

3. The method as recited in claim 1, wherein said magnetic material has a holding strength of at least sixteen ounces per square inch.

4. The method as recited in claim 1, wherein said magnetic material has a thickness of at least approximately one sixteenth of an inch and has a flexibility such that a fifteen inch long strip can be folded over on itself in a full 360° curve.

5. The method as recited in claim 1, wherein the perimeter grill portion comprises a front bar and a rear bar which are positioned on an upper body panel of the automobile so as to be upstanding therefrom, and the laterally spaced bars have upper surfaces lying in the same plan as upper surfaces of the front end rear bars so that the cover lies in a substantially uncurved planar configuration positioned in direct contact with the perimeter grill portion and the laterally spaced bars, whereby substantially all of the portions of the cover which are adjacent to the perimeter portion and the laterally spaced bars of the grill means are held magnetically to the perimeter portion and the laterally spaced bars of the grill, whereby the cover is magnetically attracted to the grill along laterally spaced locations to more effectively resist a tendency to flutter, and thus resist aerodynamic forces that tend to lift the cover off the grill means.

6. The method as recited in claim 5, wherein width and length dimensions of the cover are moderately less than the width and length dimensions of the grill means, whereby with the cover placed over the grill means, the perimeter of the cover is positioned inwardly of a perimeter edge of the front, rear and side bars which define the perimeter of the grill means.

7. In combination with an automobile air vent system where there is an upwardly facing air vent intake grill means which is comprises a perimeter grill portion and a plurality of laterally spaced bars extending in a direction of travel of the automobile and is made of a magnetically permeable material, with the grill being positioned on an upper portion of a body surface of the automobile forwardly of the forward windshield of the automobile, an improvement comprising:

a. a generally planar intake cover having a perimeter configuration substantially the same as the intake opening, said cover comprising a piece of moderately flexible magnetic sheeting material which comprises magnetic particles in a polymer binder, with substantially the entire area of the cover having the magnetic particles therein;

b. said cover being positioned over the vent intake grill means where the perimeter of the cover is over the intake opening perimeter portion so as to close the intake opening, with the cover magnetically adhering to both the perimeter grill portion and the laterally spaced bars of the grill portion and the laterally spaced bars of the grill means, so that when operating the automobile by driving it over a road surface, the cover remains positioned over the vent intake grill means to close the vent intake grill means from water and/or debris passing therethrough;

c. said air vent intake grill means having a forward and moderately downward slant, so that airflow over the hood of the car and over the cover placed on the air vent intake grill means flows at a moderately upward slant in a rearward direction, and over the windshield to create an increase in pressure over said cover, thus enhancing the cover's ability to remain positioned over the air vent grill means, said cover having a depth dimension and weight sufficiently great to resist aerodynamic flutter when it is positioned over the vent intake grill means, so as to remain substantially stationary in its position over said air vent intake grill means, whereby when the automobile is being driven over a road surface, with the cover remaining positioned over the vent intake grill means to close the vent intake grill means from water and/or debris passing therethrough.

8. The improvement as recited in claim 7, wherein said magnetic material has a holding strength of at least sixteen ounces per square inch.

9. The improvement as recited in claim 8, wherein said magnetic material has a thickness of at least approximately one sixteenth of an inch and has a flexibility such that a fifteen inch long strip can be folded over on itself in a full 360° curve.

10. The method as recited in claim 7, wherein the perimeter grill portion comprises a front bar and a rear bar which are positioned on an upper body panel of the automobile so as to be upstanding therefrom, and the laterally spaced bars have upper surfaces lying in the same plan as upper surfaces of the front end rear bars so that the cover lies in a substantially uncurved planar configuration positioned in direct contact with the perimeter grill portion and the laterally spaced bars, whereby substantially all of the portions of the cover which are adjacent to the perimeter portion and the laterally spaced bars of the grill means are held magnetically to the perimeter portion and the laterally spaced bars of the grill, whereby the cover is magnetically attracted to the grill along laterally spaced locations to more effectively resist a tendency to flutter, and thus resist aerodynamic forces that tend to lift the cover off the grill means.

11. The improvement as recited in claim 10, wherein width and length dimensions of the cover are moderately less than the width and length dimensions of the grill means, whereby with the cover placed over the grill means, the perimeter of the cover is positioned inwardly of a perimeter edge of the front, rear and side bars which define the perimeter of the grill means.

* * * * *